(12) United States Patent
Bueb

(10) Patent No.: US 8,875,006 B2
(45) Date of Patent: *Oct. 28, 2014

(54) NON-VOLATILE MEMORY WITH EXTENDED ERROR CORRECTION PROTECTION

(71) Applicant: Micron Technology, Inc., Boise, ID (US)

(72) Inventor: Christopher Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,573

(22) Filed: Jul. 22, 2013

(65) Prior Publication Data

US 2013/0311853 A1 Nov. 21, 2013

Related U.S. Application Data

(63) Continuation of application No. 13/684,919, filed on Nov. 26, 2012, now Pat. No. 8,495,481, which is a continuation of application No. 12/427,706, filed on Apr. 21, 2009, now Pat. No. 8,321,775.

(51) Int. Cl.
*G06F 11/00* (2006.01)
*G06F 11/10* (2006.01)

(52) U.S. Cl.
CPC ............ *G06F 11/10* (2013.01); *G06F 11/1048* (2013.01); *G06F 11/1068* (2013.01)
USPC .......................................... 714/799; 714/767

(58) Field of Classification Search
USPC .................. 714/799, 767, 763, 758, 764, 772
See application file for complete search history.

(56) References Cited

U.S. PATENT DOCUMENTS 6,961,890 B2 * 11/2005 Smith .......................... 714/763
7,080,309 B2    7/2006 Sharma (Continued)

FOREIGN PATENT DOCUMENTS

EP          1912121        4/2008
WO       WO 01/63613       8/2001

OTHER PUBLICATIONS

Sun et al., "Design of on-chip error correction systems for multilevel NOR and NAND flash memories", IET Circuits Devices Syst., 2007, 1, (3), pp. 241-249.

(Continued)

*Primary Examiner* — Dieu-Minh Le
(74) *Attorney, Agent, or Firm* — Knobbe Martens Olson & Bear LLP

(57) ABSTRACT

Embodiments of the present disclosure provide methods and apparatuses related to NVM devices with extended error correction protection. In some embodiments, a parity cache is used to store parity values of data values stored in a plurality of codewords of an NVM device. Other embodiments may be described and claimed.

14 Claims, 6 Drawing Sheets

(56) References Cited

U.S. PATENT DOCUMENTS

| | | |
|---|---|---|
| 7,447,948 B2 | 11/2008 | Galbi et al. |
| 7,539,052 B2 | 5/2009 | Aritome |
| 7,783,955 B2 * | 8/2010 | Murin .......................... 714/763 |
| 7,844,880 B2 * | 11/2010 | Vainsencher et al. ......... 714/764 |
| 8,120,960 B2 * | 2/2012 | Varkony ................... 365/185.16 |
| 8,122,323 B2 | 2/2012 | Leung et al. |
| 8,286,066 B2 | 10/2012 | Bueb et al. |
| 2008/0168320 A1 | 7/2008 | Cassuto et al. |
| 2008/0222490 A1 | 9/2008 | Leung et al. |
| 2009/0024903 A1 | 1/2009 | Bueb |
| 2009/0132895 A1 * | 5/2009 | Jiang et al. .................... 714/781 |
| 2009/0187803 A1 | 7/2009 | Anholt et al. |

OTHER PUBLICATIONS

Richard A. Flower., "Communications via updates of shared Memory (Corresp.)", IEEE Transactionson Information Theory, vol. IT-28, No. 4, Jul. 1982, pp. 651-655.

USPTO; Office Action dated Mar. 26, 2012, from related application U.S. Appl. No. 12/427,706 (filed Apr. 21, 2009).

* cited by examiner

NON-VOLATILE MEMORY WITH EXTENDED ERROR CORRECTION PROTECTION

CROSS-REFERENCE TO RELATED APPLICATION

This application is a continuation application of U.S. application Ser. No. 13/684,919, filed Nov. 26, 2012, now U.S. Pat. No. 8,495,481, issued Jul. 23, 2013, which is a continuation of U.S. application Ser. No. 12/427,706, filed Apr. 21, 2009, now U.S. Pat. No. 8,321,775, issued Nov. 27, 2012, the entireties of each of which are incorporated by reference herein.

FIELD OF THE INVENTION

Embodiments of the present disclosure relate to the field of memory, and more particularly, to non-volatile memory (NVM) with extended error correction protection.

BACKGROUND

Error correction code (ECC) is widely utilized to reflect data values stored in NVM devices to avoid read errors. Parity is one of the common ECC protection schemes. For an NVM device, a set of data cells and its corresponding parity cells is called a codeword.

For NVM devices that can only be programmed uni-directionally, such as flash memories, a series of data values may be written into data cells of a codeword within a programming cycle, however, parity cell(s) of the codeword may not be programmed correspondingly without any intervening erase operations. This is because a subsequent write operation normally requires at least one state of the parity cell(s) of the codeword to be reversely programmed which cannot be achieved by unidirectionally programmed NVM devices. So, currently when data cells in a codeword are programmed for a second time, the parity cells have to be disabled to avoid errors caused by unmatched parity values.

For NVM devices that can be programmed bi-directionally, such as phase change memories (PGM), the parity cells in a codeword have to be programmed every time when a data is written into the codeword, which may cause reliability problems of the parity cells.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A and/or B" means "(A), (B), or (A and B)." For the purposes of the present disclosure, the phrase "A, B, and/or C" means "(A), (B), (C), (A and B), (A and C), (B and C), or (A, B and C)."

Various logic blocks may be introduced and described in terms of an operation provided by the blocks. These logic blocks may include hardware, software, and/or firmware elements in order to provide the described operations. While some of these logic blocks may be shown with a level of specificity, e.g., providing discrete elements in a set arrangement, other embodiments may employ various modifications of elements/arrangements in order to provide the associated operations within the constraints/objectives of a particular embodiment.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
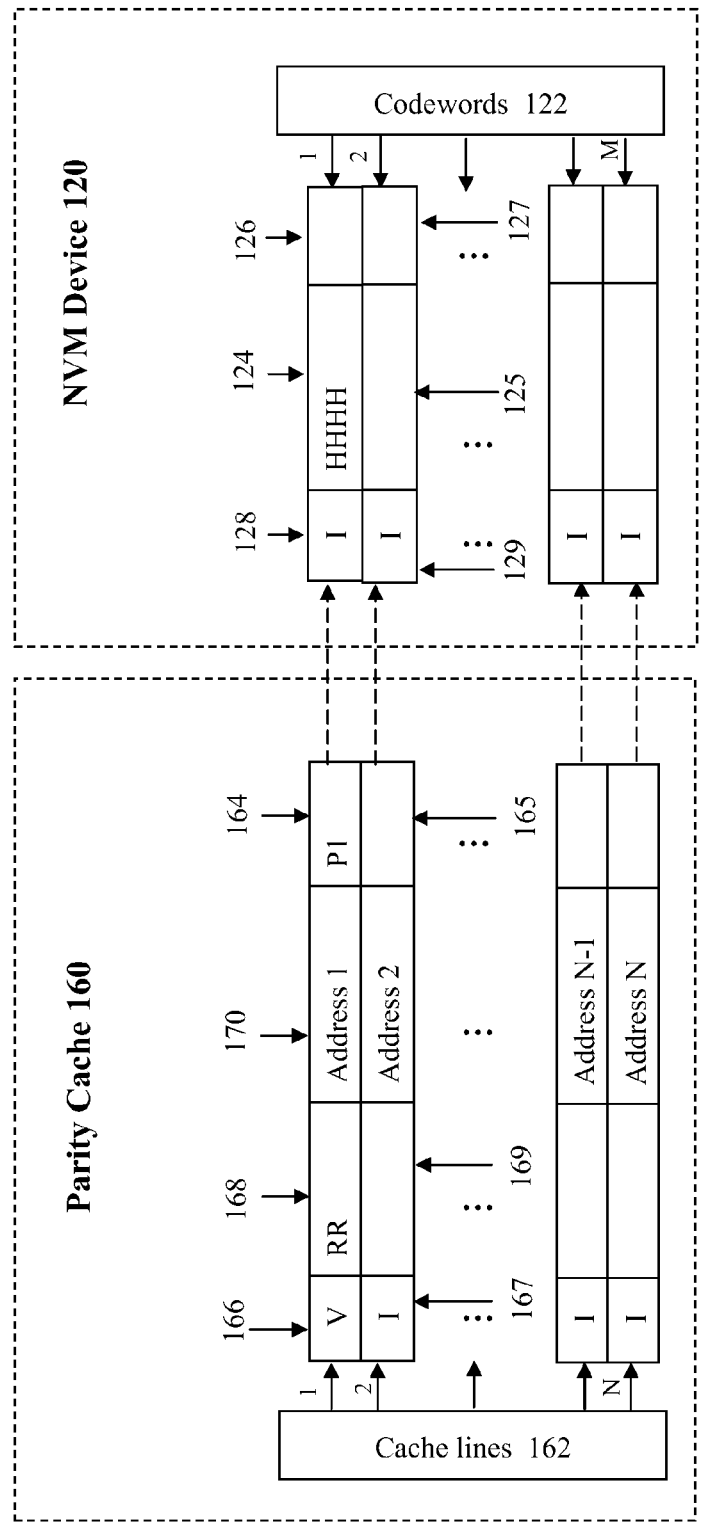
FIG. 1 illustrates a situation before writing one or more data into a NVM device with extended ECC protection in accordance with an embodiment.
Figure 2:
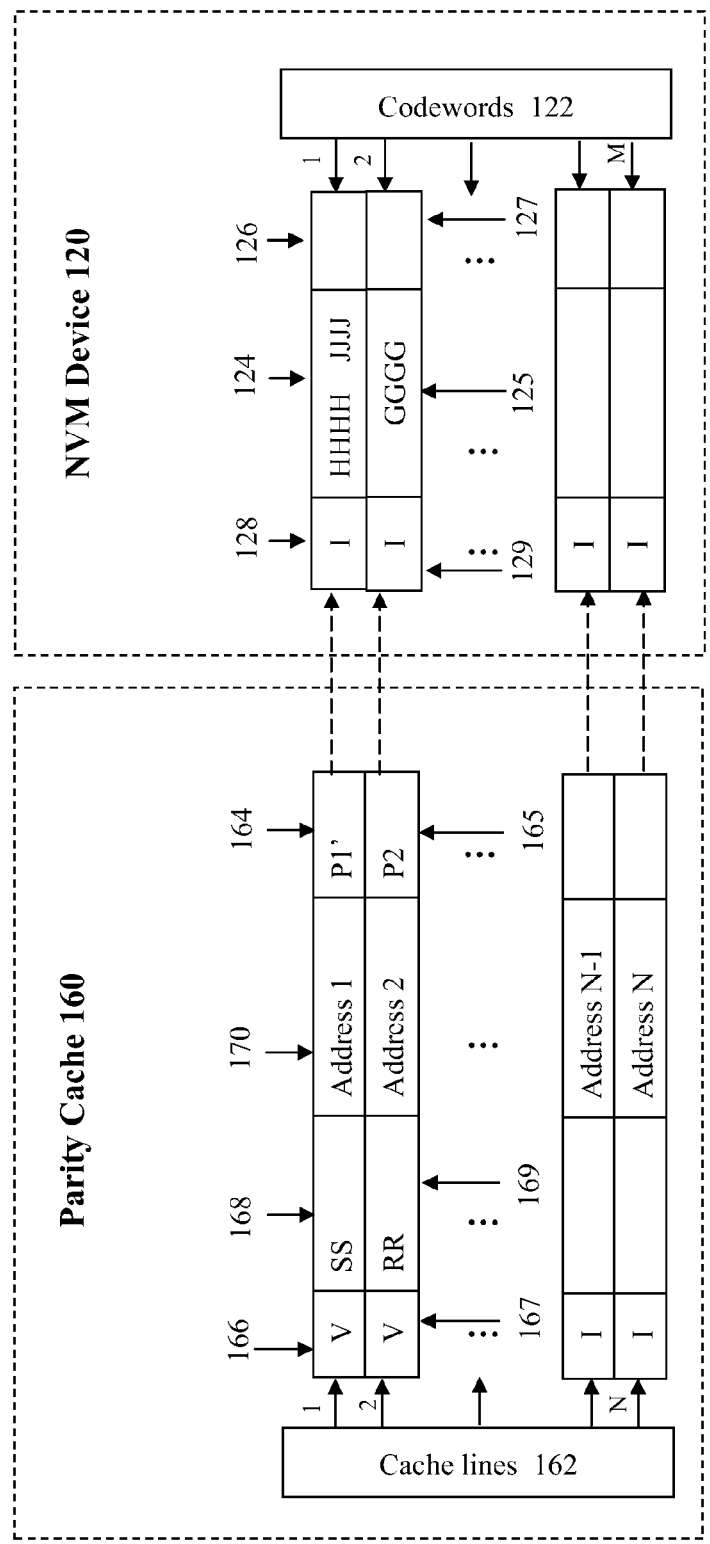
FIG. 2 illustrates a situation after writing the one or more data into the NVM device with extended ECC protection in accordance with an embodiment.

FIG. 1 and FIG. 2 illustrate the situations before and after one or more data are written into an NVM device 120 with extended ECC protection in accordance with one embodiment. In various embodiments, a parity cache 160, which may reside in a volatile memory, may be employed to facilitate the NVM device 120 in extending the ECC protection of data values stored in NVM device 120. In one embodiment, the parity cache 160 and the NVM device 120 may be included in the same chip.

In one embodiment, the NVM device 120 may comprise M codewords 122, where M is an integer. Each of the codewords 122 may include a plurality of data cells configured to store a data value and a plurality of parity cells configured to store a parity value corresponding to the data value stored in the same codeword. Each codeword 122 may also have a parity value validity indicator configured to show if the plurality of parity cells of the codeword 122 are enabled or disabled.

In various embodiments, the parity cache 160 may have N cache lines 162, where N is an integer. In one embodiment, integer M may be equal to the integer N. In one embodiment, M may not be equal to N and the parity values of the codewords 122 may be stored in the parity cache 160 only when necessary. The determination of the necessary situations will be described later in this specification.

In various embodiments, each cache line 162 may include an address field 170 to store an address value that is associated with the codeword to which the cache line 162 corresponds. In various embodiments, the corresponding relationship between the codewords 122 and the cache lines 162 may not be fixed. Each cache line 162 may also comprise a cache line validity indicator configured to show if the cache line 162 is valid or not. In various embodiments, each cache line 162 may also include a write sequence indicator configured to show the relative sequence in which all the cache lines were updated.

In various embodiments, as illustrated in FIG. 1, the data cells 124 of the codeword 122-1 may have a first data value including a word HHHH stored therein and the data cells 125 of the codeword 122-2 may have no data stored therein, e.g., they may be in an erase state. A parity value P1, reflecting the first data value including the word HHHH in data cells 124, may be stored in the cache line 162-1 of the parity cache 160 and a parity value validity indicator 128 may be set as "I" to indicate that the parity cells 126 of the codeword 122-1 is disabled regardless whether there is data in the parity cells 126 or not. In one embodiment, the cache line validity indicator 166 may be set as "V" to indicate that the cache line 162-1 is valid.

As shown in FIG. 2, the first data value stored in the codeword 122-1 may be changed to a second data value through writing another word JJJJ into the data cells 124 of the codeword 122-1. Correspondingly, the parity value P1 stored in the cache line 162-1 may be modified to P1' to reflect the second data value including words HHHH and JJJJ stored in the data cells 124. The settings of the parity value validity indicator 128 and the cache line validity indicator 166 may be kept unchanged such that the parity cells 126 in codeword 122-1 may still be disabled and the cache line 162-1 may still be shown as valid.

In various embodiments, a word GGGG may be written into the data cells 125 of the codeword 122-2. A parity value P2 which reflects the word GGGG may be written into the cache line 162-2 and the cache line validity indicator 167 of the cache line 162-2 may be set to "V" to show that the cache line 162-2 is valid. The parity value validity indicator 129 of the codeword 122-2 may be set to "I" to show that the parity cell 127 is disabled.

Figure 3:
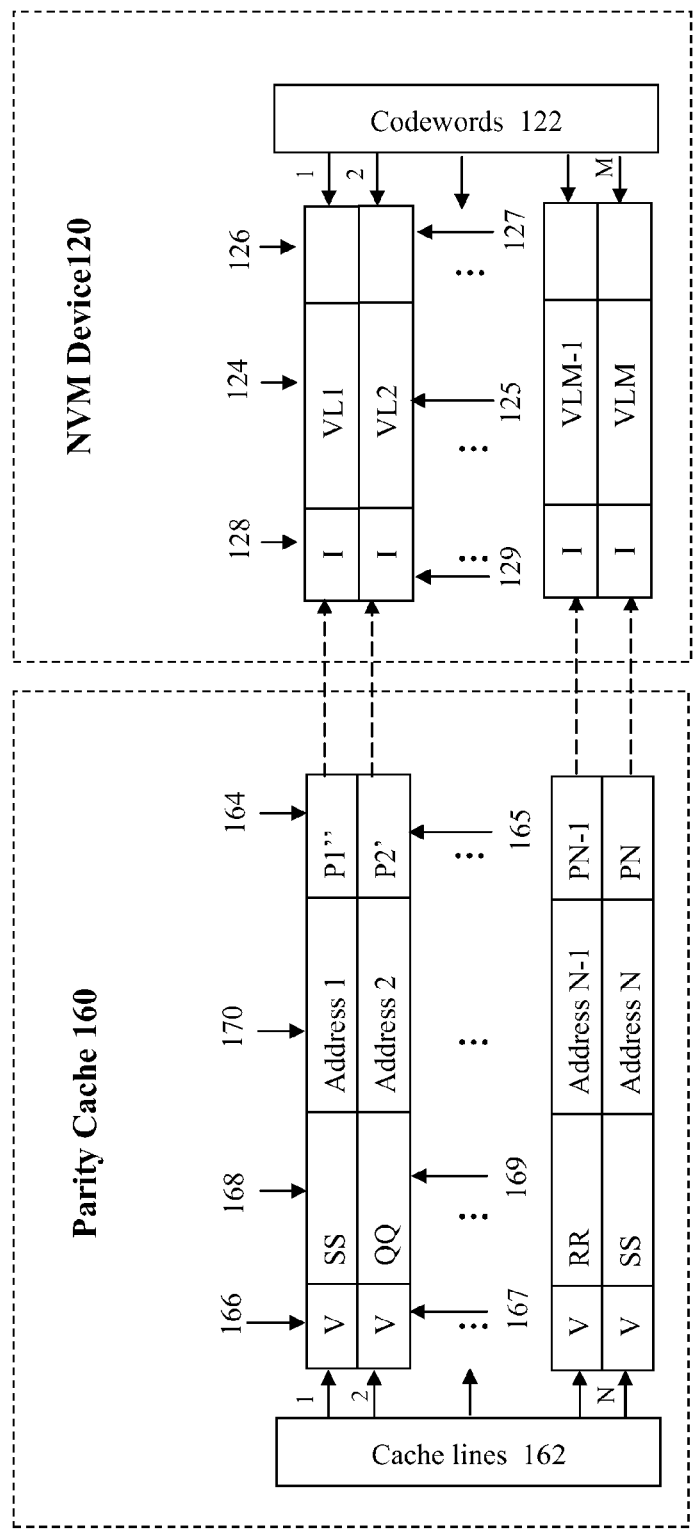
FIG. 3 illustrates a situation before flushing a parity value from a parity cache to the NVM device in accordance with an embodiment.
Figure 4:
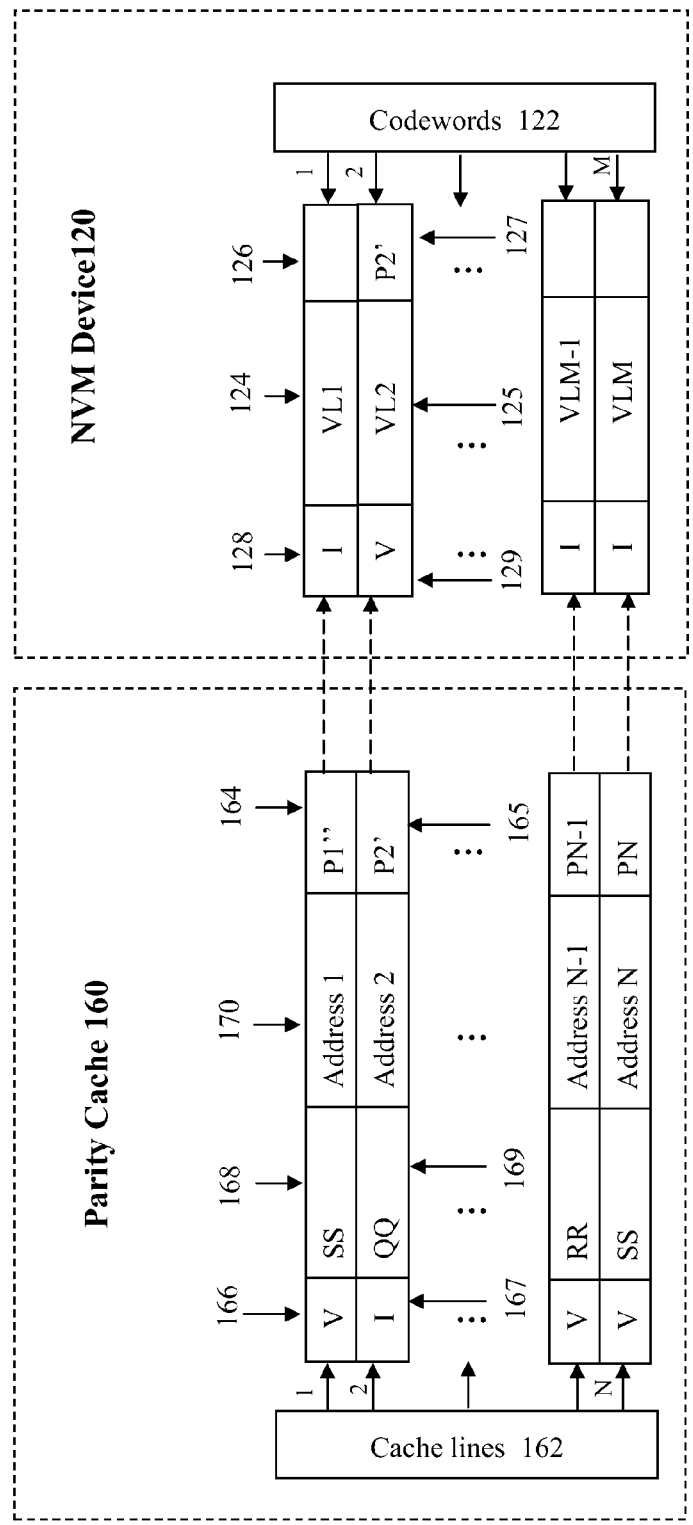
FIG. 4 illustrates a situation after flushing the parity value from a parity cache to the NVM device in accordance with an embodiment.

FIGS. 3 and 4 illustrate the situations before and after a parity value is flushed out from the parity cache 160 to the NVM device 120 with extended ECC protection in accordance with one embodiment. In various embodiments, the parity cache 160 may be full and it may be desirable for one or more parity values to be flushed out from the parity cache 160 so that the corresponding one or more cache lines may be overwritten and used to accommodate one or more new parity values. In various embodiments, parity values may be flushed out from the parity cache 160 under other situations, for example, when a power loss occurs, parity values in the parity cache 160 may be flushed out to minimize the lost of parity values. In various embodiments, when one or more of the codewords 120 are to be erased, the parity values of these codewords may be flushed out from the parity cache 160 and the parity cells of these codewords may be enable to store the flushed-out parity values.

In one embodiment, parity values in cache lines that are least recently written may be flushed out. In another embodiment, parity values to be flushed out from the parity cache 160 may be determined randomly.

As shown in FIG. 3, the cache line validity indicator in each of the cache lines 162 may be set as "V" showing that all cache lines in the parity cache 160 are valid. In one embodiment, a write sequence indicator may be used to show when a cache line 162 was written relative to other cache lines so that parity values in the least recently written cache lines may be flushed out from the parity cache 160. In one embodiment, as shown in FIG. 3, the value "00" of the write sequence indicator 169 may indicate that the cache line 162-2 has been the least recently written and the parity value P2' stored therein may be flushed out from the parity cache 160.

In one embodiment, as shown in FIG. 4, the parity value P2' in the cache line 162-2 reflecting data value VL2 in codeword 122-2 may be flushed out and be stored in the corresponding parity cells 127 of the codeword 122-2 in the NVM device 120. In one embodiment, the cache line validity indicator 167 may be set as "I" to show that the cache line 162-2 is no longer valid and the parity value validity indicator 129 may be set as "V" to show that the parity cells 127 of the codeword 122-2 in the NVM device 120 is enabled. In various embodiments, cache line 122-2 may be overwritten and used to store a new parity value after the parity value P2' is flushed out.

Figure 5:
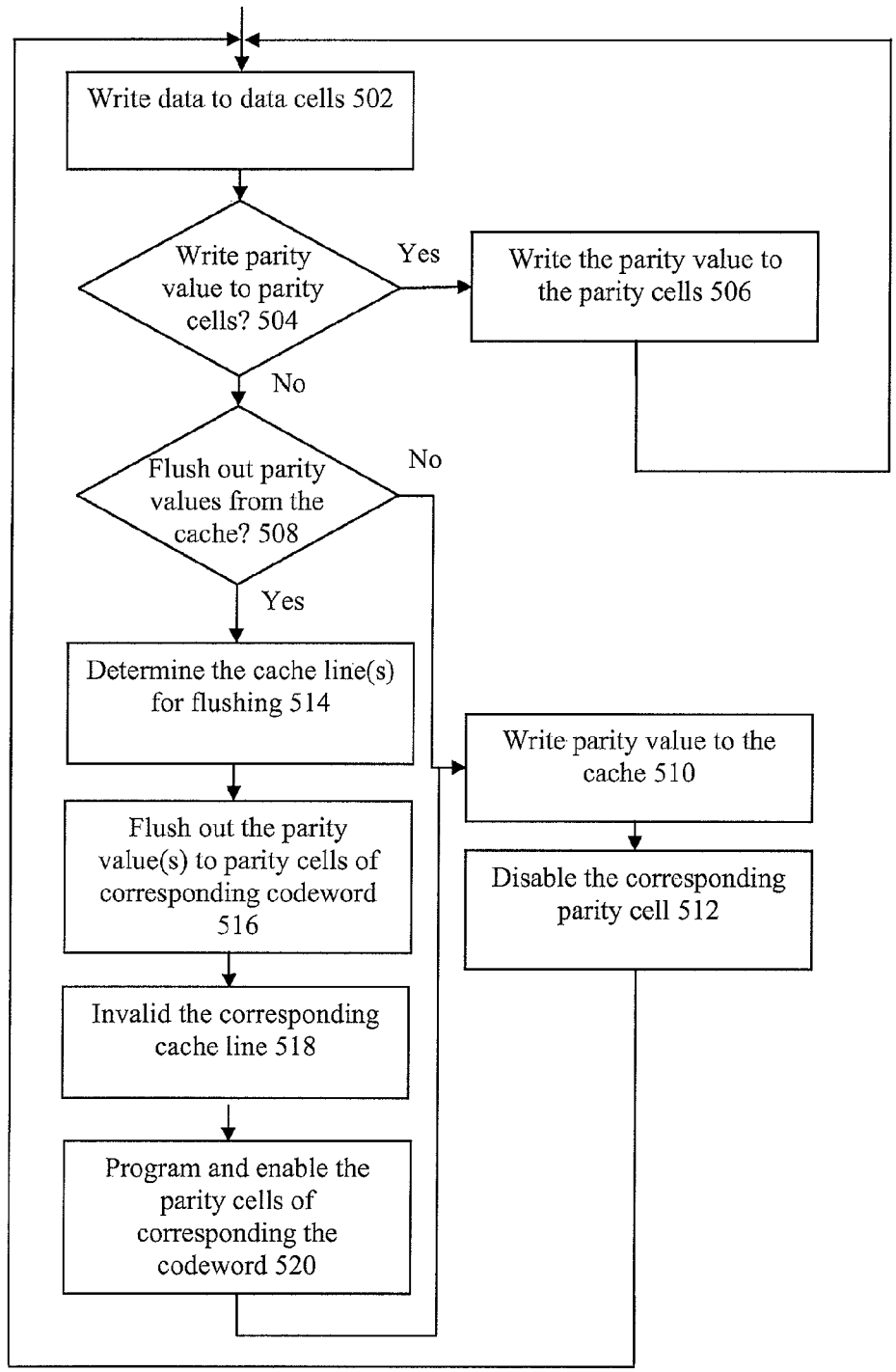
FIG. 5 illustrates a method for operating a NVM device with extended ECC protection in accordance with an embodiment.

FIG. 5 is a flowchart depicting a method for a controller configured to operate an NVM device with extended ECC protection within a programming cycle in accordance with various embodiments. A programming cycle, as used herein, may be a consecutive series of programming iterations upon a codeword without an intervening erase operation. A controller, as used herein, may be any type of controlling device/logic that may implement the following described operations, and the controller may include firmware, state machine or microcode, and so forth.

At block 502, a controller may write a data to a codeword of the NVM device with extended ECC protection resulting a data value. At block 504, the controller may determine if a parity value reflecting the data value in the codeword should be written into parity cells of this codeword in the NVM device or not.

In various embodiments, this determination at block 504 may be made based on the number of protected writes W remaining in the programming cycle that the parity cells of the codeword can be programmed coherently with the data cells to reflect a data value stored in the same codeword. In one embodiment, if this number W is lower than a pre-determined threshold K, then the parity value may be written to the parity cache, otherwise the parity value may be stored in the parity cells of the codeword.

In one embodiment, the number W may be determined based at least on the total number of times T that the parity cells of the codeword can be unidirectionally programmed in each programming cycle while still maintaining the coherency with the data cells, and the number of times P that the parity cells of the codeword have been unidirectionally programmed in the programming cycle. In one embodiment, the numbers P and T may be determined based at least on the number of the parity cells and the type of the parity cells. In one embodiment, the number P may be determined based on the states of the parity cells of the codeword. In one embodiment, when there is no data existing in the data cells of the codeword prior to the writing at block 502, the parity value of the first written data value may be stored in the parity cells of the codeword.

In various embodiments, the determination at block 504 may also be based on the likelihood of the codeword to be re-written. In one embodiment, the likelihood of the codeword to be re-written may be based on the data that already exist in the codeword prior to block 502. In another embodiment, if the data already exist in the codeword is large, for example 16 bits, then the likelihood of the codeword to be rewritten may be low, therefore the parity value may be stored in the parity cells.

In various embodiments, the likelihood of the codeword to be re-written may also be based on data that is being written to the codeword. In one embodiment, when the data that is being written to the codeword is small, for example 2 bits, the likelihood of the codeword to be re-written may be high, therefore the parity value may be stored in the parity cache. In other embodiments, the determination at block 504 may be made based on criteria defined by users for different applications.

At block 506, based on the determination made at block 504, the controller may write the parity value into the parity cells of the codeword. In one embodiment, the controller may go back to block 502 to write a new data to the codeword.

In one embodiment, if it is determined at block 504 that the parity value should not be written into the parity cells of the codeword, the controller may determine at block 508 if any parity values need to be flushed out from the parity cache. In one embodiment, the determination may be made based at least on whether the number of empty cache lines is below a pre-determined threshold E, where E is an integer.

In one embodiment, if the number of empty cache lines is larger than the pre-determined threshold E, the controller may go to block 510 to write the parity value into the parity cache. At block 512, the controller may disable the parity cells of the corresponding codeword. Then the controller may go back to block 502 to write a new data to the codeword again.

In one embodiment, if at block 508 it is determined that the number of empty cache lines is smaller than the threshold value E, which means one or more parity values stored in one or more cache lines may need to be flushed out from the parity cache. At block 514 the controller may search for one or more cache lines for flushing. In one embodiment, the controller may randomly choose cache lines for flushing. In another embodiment, the controller may choose the least recently written cache lines for flushing. The least recently written cache lines may be found based at least on the value of the write sequence indicator of each cache line.

In one embodiment, a least recently written cache line may be located and the controller at block 516 may flush the parity value stored in this least recently written cache line out to the parity cells of a corresponding codeword in the NVM device. This least recently written cache line with flushed out parity value may be indicated as invalid at block 518. At block 520, parity cells of the corresponding codeword may be programmed based on the flushed out parity value and may be enabled. The controller may go to block 510 to overwrite the least written cache line and write in the parity value that is determined to be written to the parity cache at block 504.

Figure 6:
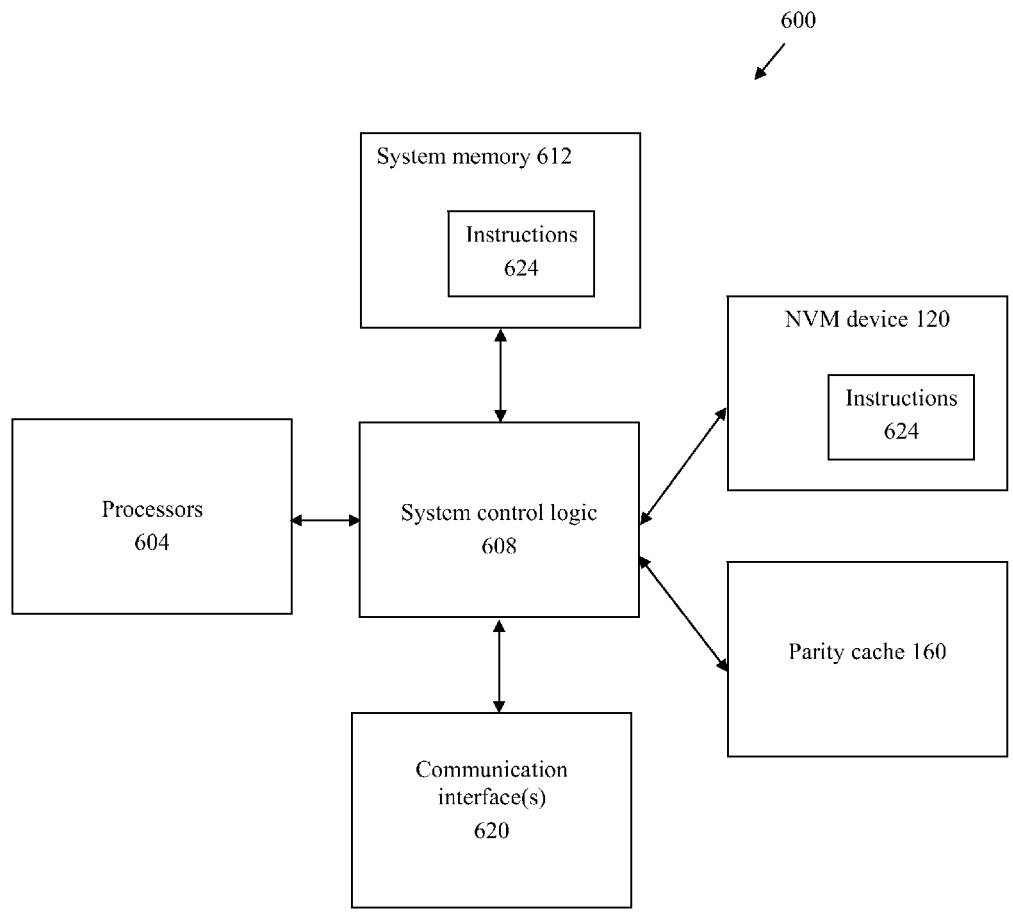
FIG. 6 illustrates a host device incorporating an NVM device with extended ECC protection in accordance with an embodiment.

FIG. 6 illustrates a host device 600 that may host the NVM device 120 and parity cache 160 in accordance with some embodiments. The host device 600 may include one or more processors 604; system control logic 608 coupled to at least one of the processor(s) 604; system memory 612 coupled to the system control logic 608; the NVM device 120 and parity cache 160 coupled to the system control logic 608; and one or more communication interface(s) 620 coupled to the system control logic 608.

System control logic 608 for one embodiment may include any suitable interface controllers to provide for any suitable interface to the components with which it is coupled. The system control logic 608 may include the controller described above to operate the NVM device 120 and the parity cache 160.

System memory 612 may be used to load and/or store data/instructions, for example, for the host device 600. In some embodiments, the system memory 612 may include the parity cache 160. System memory 612 may include any suitable volatile memory, such as, but not limited to, suitable dynamic random access memory (DRAM).

The NVM device 120 may also be used to load and/or store data/instructions, for example, for the host device 600. The NVM device 120 may include any suitable non-volatile memory, such as, but not limited to, NOR flash memory, NAND flash memory, phase change memory, etc. In some embodiments, system memory 612 may include the parity cache 160.

In some embodiments, instructions 624 may, when executed by the processor(s) 604, result in the host device 600 and/or the NVM device 120 and parity cache 160 performing at least some of the operations described above. The instructions may be located in the NVM device 120 and/or the system memory 612. In some embodiments, the instructions 624 may additionally/alternatively be located in the system control logic 608.

Communication interface(s) 620 may provide an interface for the host device 600 to communicate over one or more networks and/or with any other suitable device. Communication interface(s) 620 may include any suitable hardware and/or firmware. Communication interface(s) 620 for one embodiment may include, for example, a network adapter, a wireless network adapter, a telephone modem, and/or a wireless modem. For wireless communications, communication interface(s) 620 for one embodiment may use one or more antennas.

For one embodiment, at least one of the processor(s) 604 may be packaged together with logic for one or more controllers of system control logic 608. For one embodiment, at least one processor of the processor(s) 604 may be packaged together with logic for one or more controllers of system control logic 608 to form a System in Package (SiP). For one embodiment, at least one processor of the processor(s) 604 may be integrated on the same die with logic for one or more controllers of system control logic 608. For one embodiment, at least one processor of the processor(s) 604 may be integrated on the same die with logic for one or more controllers of system control logic 608 to form a System on Chip (SoC).

In various embodiments, the host device 600 may be a desktop or laptop computer, a server, a set-top box, a digital recorder, a game console, a personal digital assistant, a mobile phone, a digital media player, a digital camera, etc. The host device 700 may have more or less components and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Similarly, memory devices of the present disclosure may be employed in host devices having other architectures. This application is intended to cover any adaptations or variations of the embodiments discussed herein. Therefore, it is manifestly intended that embodiments in accordance with the present disclosure be limited only by the claims and the equivalents thereof.

What is claimed is:

1. An electronically implemented method of storing error correction code (ECC), the method comprising:

programming a first location of a non-volatile memory to store first data;
storing an error correction code in a cache memory, the error correction code corresponding to the first data written to the non-volatile memory;
programming a second location of the non-volatile memory to store second data;
modifying the error correction code to reflect the second data;
determining whether or not to program the modified error correction code to the non-volatile memory based at least partly on a comparison between a number of protected writes and a pre-determined threshold;
if it is determined to program the modified error correction code, programming the error correction code to the non-volatile memory; and
if it is determined not to program the modified error correction code, storing the modified error correction code in the cache memory.

2. The method of claim 1, wherein the first data, the second data, and the error correction code belong to a first codeword, the method further comprising:
programming the error correction code to the non-volatile memory; and
invalidating a corresponding line of the cache memory.

3. The method of claim 1, wherein it is determined not to program the modified error correction code, the method further comprises:
determining whether or not to partially flush out the parity cache based at least partly on a number of empty cache lines in the parity cache;
if it is determined to partially flush out the parity cache, selecting a least recently written cache line for flushing, and programming a corresponding codeword in the non-volatile memory with the error correction code stored in the selected cache line; and
if it is determined not to partially flush out the parity cache, programming the modified error correction code to the non-volatile memory.

4. The method of claim 3, further comprising invalidating the selected cache line of the parity cache.

5. The method of claim 1, wherein the non-volatile memory comprises a flash memory device.

6. An apparatus comprising:
a non-volatile memory configured to store a plurality of codewords, wherein each codeword comprises a data value and a corresponding error correction code;
a cache memory; and
a controller coupled with the non-volatile memory and the cache memory, wherein the controller is configured to:
program a first location of the non-volatile memory to store first data;
store an error correction code in a cache memory, the error correction code corresponding to the first data written to the non-volatile memory;
program a second location of the non-volatile memory to store second data;
modify the error correction code to reflect the second data;
determine whether or not to program the modified error correction code to the non-volatile memory based at least partly on a comparison between a number of protected writes and a pre-determined threshold;
if it is determined to program the modified error correction code, program the error correction code to the non-volatile memory; and
if it is determined not to program the modified error correction code, store the modified error correction code in the parity cache.

7. The apparatus of claim 6, wherein the first data, the second data, and the error correction code belong to a first codeword, wherein the controller is further configured to:
program the error correction code to the non-volatile memory; and
invalidate a corresponding line of the parity cache 8. The apparatus of claim 6, wherein if it is determined not to program the modified error correction code, the controller is further configured to:
determine whether or not to partially flush out the parity cache based at least partly on a number of empty cache lines in the parity cache;
if it is determined to partially flush out the parity cache, select a least recently written cache line for flushing, and program a corresponding codeword in the non-volatile memory with the error correction code stored in the selected cache line; and
if it is determined not to partially flush out the parity cache, program the modified error correction code to the non-volatile memory.

9. The apparatus of claim 8, wherein the controller is further configured to invalidate the selected cache line of the parity cache.

10. The apparatus of claim 6, wherein the non-volatile memory comprises a flash memory.

11. A system comprising:
a processor configured to issue at least one of a read operation or a write operation;
a memory device comprising:
a non-volatile memory configured to store a plurality of codewords, wherein each codeword comprises a data values and a corresponding error correction code;
a cache memory; and
a controller coupled with the non-volatile memory and the cache memory, wherein the controller is configured to:
program a first location of the non-volatile memory to store first data;
store an error correction code in a cache memory, the error correction code corresponding to the first data written to the non-volatile memory;
program a second location of the non-volatile memory to store second data;
modify the error correction code to reflect the second data;
determine whether or not to program the modified error correction code to the non-volatile memory based at least partly on a comparison between a number of protected writes and a pre-determined threshold;
if it is determined to program the modified error correction code, program the error correction code to the non-volatile memory; and
if it is determined not to program the modified error correction code, store the modified error correction code in the parity cache.

12. The system of claim 11, wherein the first data, the second data, and the error correction code belong to a first codeword, wherein the controller is further configured to:
program the error correction code to the non-volatile memory; and
invalidate a corresponding line of the parity cache.

13. The system of claim 11, wherein if it is determined not to program the modified error correction code, the controller is further configured to:
- determine whether or not to partially flush out the parity cache based at least partly on a number of empty cache lines in the parity cache;
- if it is determined to partially flush out the parity cache, select a least recently written cache line for flushing, and program a corresponding codeword in the non-volatile memory with the error correction code stored in the selected cache line; and
- if it is determined not to partially flush out the parity cache, program the modified error correction code to the non-volatile memory.

14. The system of claim 11, wherein the non-volatile memory comprises a flash memory device.

* * * * *